(No Model.)

L. J. RICHARDS.
COFFEE OR TEA POT.

No. 412,667. Patented Oct. 8, 1889.

Witnesses
L. Douville
Wm H. Moon

Inventor
Lucius J. Richards
By his Attorneys
Niedersheim & Kühner

UNITED STATES PATENT OFFICE.

LUCIUS J. RICHARDS, OF PHILADELPHIA, PENNSYLVANIA.

COFFEE OR TEA POT.

SPECIFICATION forming part of Letters Patent No. 412,667, dated October 8, 1889.

Application filed October 12, 1888. Serial No. 287,911. (No model.)

*To all whom it may concern:*

Be it known that I, LUCIUS J. RICHARDS, a citizen of the United States, residing in the city and county of Philadelphia, State of Pennsylvania, have invented a new and useful Improvement in Coffee or Tea Pots, which improvement is fully set forth in the following specification and accompanying drawings.

My invention relates to improvements in a coffee or tea pot having a sack or bag in which the coffee or tea is contained as a percolator; and it consists of means for distending said sack and supporting it within the pot, as will be hereinafter fully set forth.

Figure 1:
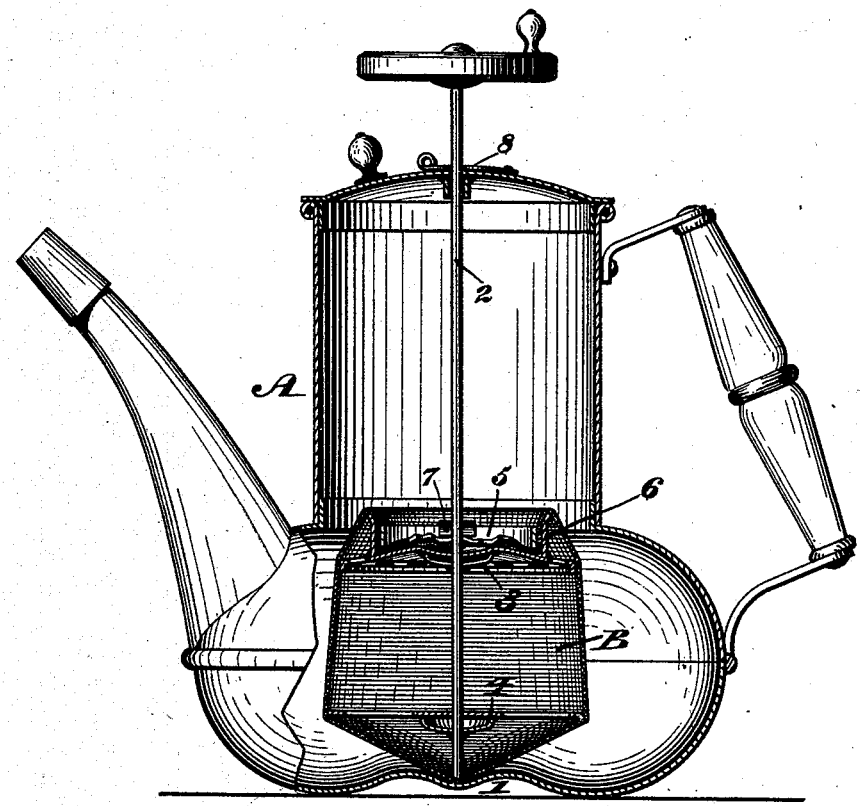
Figure 2:
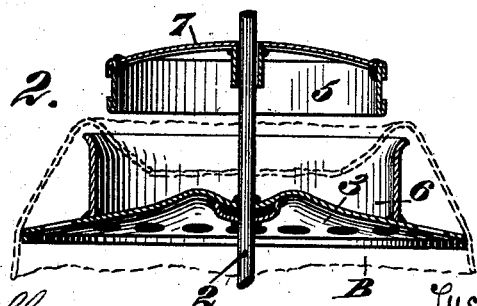

Figure 1 represents a partial side elevation and partial vertical section of a coffee or tea pot embodying my invention. Fig. 2 represents a vertical section of a portion thereof on an enlarged scale.

Similar letters and numerals of reference denote corresponding parts in the two figures.

Referring to the drawings, A represents a coffee or tea pot having its bottom dishing, leaving at the center thereof the concavity 1, forming a step for the rod spindle or shaft 2, which supports the sack B. Firmly secured to the spindles are perforated diaphragms or spiders 3 and 4, which are located one above the other, and separated a distance relatively to the depth of the chamber formed by the sack. Freely fitted on the spindle above the diaphragm 3 is a band or ring 5, which is adapted to enter a vertical rim 6, rising from said diaphragm 3. The ring 5 has secured to it a cross head or piece 7, in the center of which is an opening through which the spindle passes, whereby the ring is permitted to be raised and lowered on said spindle while it is attached to the same, the cross-head also serving as a handle for conveniently manipulating the ring. In Fig. 2 the cross-head is shown at a right angle to that in Fig. 1.

The operation is as follows: The sack, with the diaphragms therein, is supplied with coffee or tea and the ring 5 raised above the diaphragm 3. The top or mouth of the sack is folded once and into the rim 6, as will be seen in Fig. 2, and the ring 5 lowered, whereby said mouth is clamped between the rings and rim, thus firmly connecting the sack with the spindle and holding the side and bottom of same properly distended. The diaphragm 3 prevents downward displacement of ring 5 and assists in the clamping action on the mouth of the sack. The coffee or tea as a beverage may now be made in any suitable manner, the sack being lowered into the pot and acting as a percolator. When it is desired to agitate the contents of the sack it may be accomplished by rotating the spindle, for which purpose the top of the latter is provided with a crank or crank-handle, and when the spindle is raised it may be held by means of a catch 8, which is pivoted to the lid of the pot. The spindle, with the attached sack, may be lifted from the pot, after which the ring 5 is raised, thus relieving the mouth of the sack and permitting the latter to be opened, so that the coffee-grounds or tea-leaves may be removed or the sack entirely disconnected from the spindle and diaphragms.

Having thus described my invention, what I claim as new, and desire to secure by Letters Patent, is—

1. The combination of a sack with a holder having a diaphragm provided with a flange rising therefrom, a rod supporting said diaphragm, and a ring which is movably fitted on said rod and adapted to engage with said flange, whereby the sack may be distended and its mouth clamped between the flange and ring, the parts named being combined substantially as described.

2. A coffee or tea pot having a dishing bottom with a concavity therein, a vertical rod stepped in said concavity, perforated diaphragms secured to said rod, a sack sustained by said diaphragms, a flange rising from one of said diaphragms, and a ring with cross-piece having opening therein, said parts being combined substantially as and for the purpose set forth.

3. A coffee or tea pot having a rotatable rod journaled therein, perforated diaphragms secured to said rod, a sack or percolator sustained by said diaphragms, a rim attached to one of said diaphragms, and a ring fitting in said rim and having a cross-piece, the latter serving as a bearing for said rotatable rod, and a catch to engage said rod, said parts being combined substantially as and for the purpose set forth.

LUCIUS J. RICHARDS.

Witnesses:
JOHN A. WIEDERSHEIM,
A. P. JENNINGS.